(12) United States Patent
Klingel

(10) Patent No.: US 6,642,479 B2
(45) Date of Patent: Nov. 4, 2003

(54) LASER CUTTING MACHINE AND METHOD

(75) Inventor: Hans Klingel, Möglingen (DE)

(73) Assignee: Trumpf GmbH + Co., Ditzingen (DE)

( * ) Notice: Subject to any disclaimer, the term of this patent is extended or adjusted under 35 U.S.C. 154(b) by 1 day.

(21) Appl. No.: 10/308,305

(22) Filed: Dec. 3, 2002

(65) Prior Publication Data

US 2003/0116546 A1 Jun. 26, 2003

Related U.S. Application Data

(62) Division of application No. 09/657,795, filed on Sep. 8, 2000, now Pat. No. 6,509,545.

(30) Foreign Application Priority Data

Sep. 9, 1999 (DE) .......................................... 199 43 043

(51) Int. Cl.⁷ .............................................. B23K 26/00
(52) U.S. Cl. ............................ 219/121.72; 219/121.69; 219/121.85
(58) Field of Search ...................... 219/121.72, 121.69, 219/121.85, 121.67, 121.68

(56) References Cited

U.S. PATENT DOCUMENTS

| 3,764,775 A | 10/1973 | Hasslinger et al. |
| 4,698,480 A | 10/1987 | Klingel |
| 5,338,914 A | 8/1994 | Omote |
| 5,648,002 A | 7/1997 | Omote |
| 6,469,274 B1 * | 10/2002 | Delzenne et al. ...... 219/121.44 |

FOREIGN PATENT DOCUMENTS

| DE | 19525989 A1 | 6/1987 |
| DE | 3642745 C2 | 7/1995 |

* cited by examiner

Primary Examiner—M. Alexandra Elve

(57) ABSTRACT

A machine and a process for thermal cutting of workpieces has at least one workpiece support (8) for the workpiece, at least one thermal cutting device (2), and at least one machine device (10, 11) to move the workpiece support (8) and the cut product adhering to the workpiece support (8) after the workpiece is cut relative to at least one stop (10) to loosen cut product adhering to the workpiece support (8).

10 Claims, 6 Drawing Sheets

LASER CUTTING MACHINE AND METHOD

The present application is a division of U.S. application Ser. No. 09/657,795 filed Sep. 8, 2000, now U.S. Pat. No. 6,509,545.

BACKGROUND OF THE INVENTION

The invention concerns a machine for thermal cutting of workpieces, especially a laser-cutting machine, with at least one workpiece support for the workpiece being tooled, as well as at least one cutting device. The invention also concerns a process that can be carried out with a machine like the one described for thermal cutting, especially laser cutting, of workpieces, wherein after a workpiece has been tooled, the cut product separated from the workpiece and a workpiece support are moved relative to one another.

In thermal cutting, for example by means of laser or flame-cutting machines, the workpiece in question is reduced to a fluid state in the cutting area. As a result, occasionally, it is seen that in typical machines and in typical processes, after the workpiece is tooled, the cooled cut product, especially parts of the workpiece produced by cutting the workpiece in question, when tooling any cutting waste or the tooled workpiece itself cut into, for example— is welded to the workpiece support in the area which was first liquefied. To prevent interference with the work cycle in process or subsequent cycles due to the adhesion of the cut product to the workpiece support, the cut product adhering to the workpiece support must be removed.

The problem of this invention is to provide a machine that enables such removal simply and effectively and to provide a process for doing so.

SUMMARY OF THE INVENTION

The goal of the invention, in terms of a device, is attained by means of a machine of the type described at the beginning that has at least one mechanical device to produce relative movement of the workpiece support and of cut product adhering to the workpiece support after a workpiece has been cut. The mechanical device has at least one stop for cut product adhering to the workpiece support, and the stop and the workpiece support can be moved relative to one another to loosen cut product adhering to the support.

The choice of the direction of the relative movement between the workpiece support and the stop for the cut product adhering to it is preferably perpendicular to the elements or ribs of the grid support because of the fact that several pieces of cut product produced when the workpiece is cut and welded to the workpiece support, if necessary, lie next to one another in the direction as claimed and consequently can be reached kinematically simply with a correspondingly directed relative movement between the stop and the workpiece support and loosened from the workpiece support. Also, on machines of this type, a large number of such directed relative movements take place with the participation of the workpiece support and are also used to remove cut product from the workpiece support.

A movable stop is especially advantageous for machines in the invention with fixed workpiece supports. The stop for cut product adhering to the workpiece support can then be coupled with machine parts moved in relation to the workpiece support.

In the interest of the most structurally simple design possible of the whole arrangement, it is advisable to design individual machine parts to perform several functions, such as a movable holder.

One machine design should be mentioned in particular, and that is using the cut piece being moved by the transport device to impact the scrap pieces. With this type of machine, any parts of workpieces that occur during cutting that do not adhere to the workpiece support, i.e., free parts whether they are parts cut during the cutting operation or waste parts right after the end of the cutting cycle. The free parts can be used to loosen cut product welded to the workpiece support from the workpiece support. This can minimize the time spent loosening cut product from the workpiece support, which has a negative effect on the time that can be achieved.

In another embodiment, the workpiece support can be moved relative to the machine stop to remove cut product adhering to it. The machine control is used for automated operation of the machine in the present invention, so that the device for producing relative movement between the workpiece support and cut product adhering to it can be controlled by computer.

By computer control of the machine, the relative movement between the workpiece support and the stop for cut product adhering to the workpiece support may take place routinely after the workpiece is cut to a free piece and this makes automated machine operation relatively easy. Thus, to prevent the structural and technological expense otherwise necessary after the workpiece is cut, first checking the workpiece support for cut product adhered to it and then introducing the relative movement of workpiece support and stop to loosen cut product can be left out only if cut waste has actually been found adhering to the workpiece support when it is checked.

After a workpiece is cut, the free cut product and the workpiece support to impact the cut product adhering to the workpiece support, are moved relative to one another crosswise to the direction of the ribs of the grid of the workpiece support. This relative movement allows cut product adhering to the workpiece support to be loosened from the workpiece support reliably by action of free cut pieces. The amount of relative movement described in the crosswise direction of the reinforcement on the workpiece support can be very small and can lie in the millimeter range.

Preferably, the free cut product used as a stop is always slid over a short distance on the workpiece support and accordingly is exposed to less friction.

BRIEF DESCRIPTION OF THE DRAWINGS

The invention will be described in greater detail below using schematic drawings as examples of the several embodiments.

FIG. 1a is an enlarged detail of the machine of FIG. 1;

FIG. 2a is an enlarged detail of the embodiment of FIG. 2;

DETAILED DESCRIPTION OF THE ILLUSTRATED EMBODIMENTS

Figure 1:
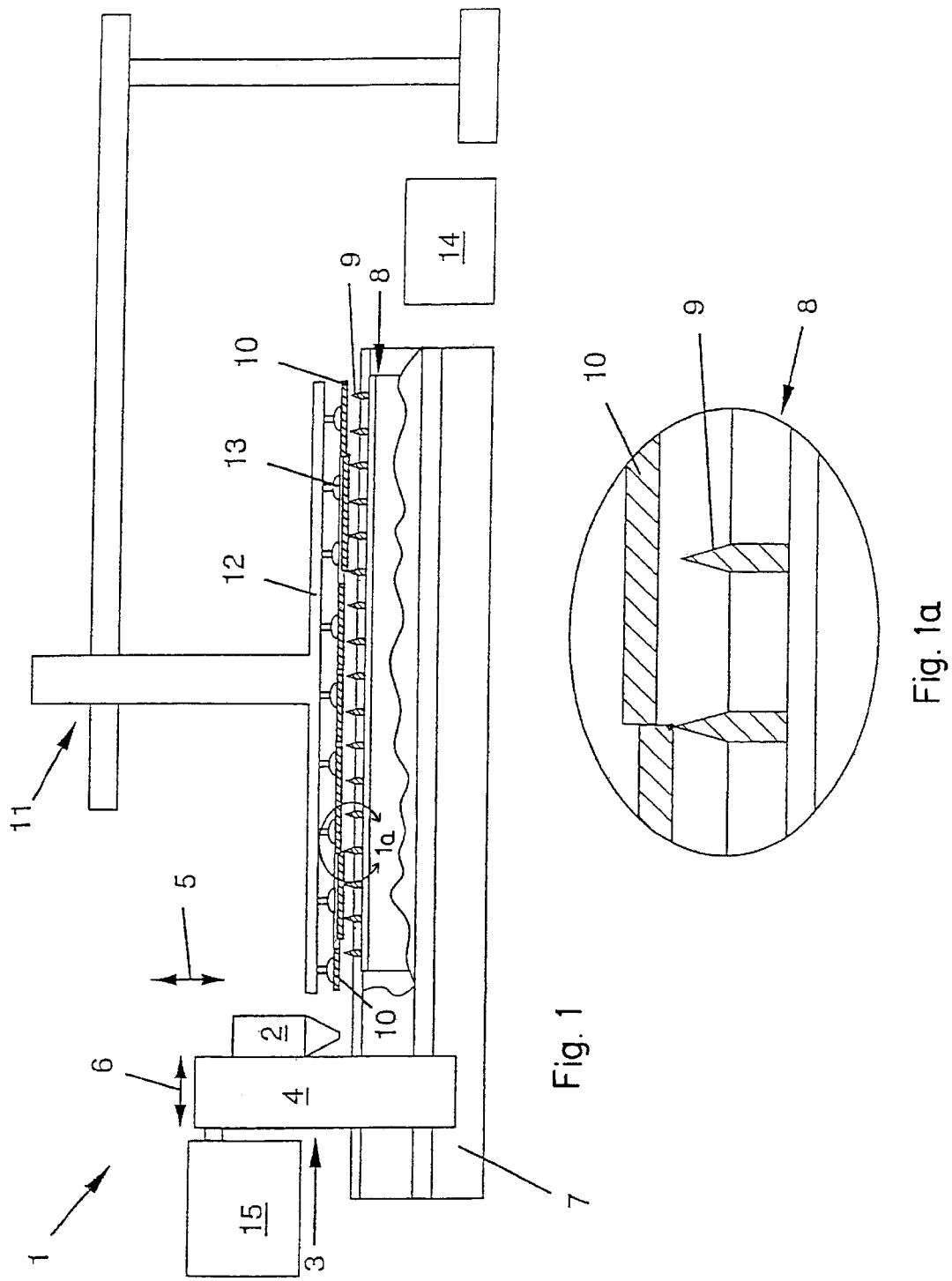
FIG. 1 is a schematic illustration of a laser cutting machine embodying the present invention.

The laser cutting machine 1 in FIG. 1 has a cutting device in the form of a laser-cutting head 2, which is supported as known on a machine support or bridge 3, of which only one of the two vertical holders, namely the vertical holder 4, can be seen in FIG. 1. The laser-cutting head 2 can be driven in a plane perpendicular to the plane of projection in FIG. 1. The laser-cutting head 2 can also be lifted and lowered in the direction of double arrow 5. The machine support 3 can move in the direction of double arrow 6 along with the laser-cutting head 2, and moves on the machine frame 7 when it moves.

A fixed workpiece support 8 with upstanding rib-like projections 9 is used to support a workpiece in the form of a piece of sheet metal, which, in the example shown, will be traversed by the machine support or bridge 3. The laser-cutting machine 1 includes a workpiece transport device 11 of the usual type. A holder of the workpiece transport device 11 designed as a hoisting frame 12 can move in all the three coordinate directions (X, Y and Z), and it has a large number of pneumatic suction devices 13 on its lower surface.

Computer controls 14 are used to control all machine functions of the laser-cutting machine 1, including the workpiece transport device 11 and a laser generator 15, which produces the laser-cutting beam for tooling the workpiece.

FIG. 1 shows the relationships on the laser-cutting machine 1 after the sheet metal cutting operation is completed. First the uncut sheet metal workpiece is laid on the workpiece support by the workpiece transport device 11. Then the sheet metal workpiece is cut into two halves with a corresponding cut by the laser-cutting head 2 perpendicular to the plane of projection, before individual shapes or contours are cut out from the workpiece as cutting waste from the two halves of the sheet metal as the laser-cutting head 2 is moved accordingly. The cut products from the cutting operation on the workpiece are two pieces 10 of sheet metal and the cutting waste mentioned. The cut-pieces 10 of sheet metal lie loose on the workpiece support 8 after the sheet metal is cut. The cutting waste, on the other hand, was as the enlarged detail of FIG. 1 shows is welded to some of the rib-like projections 9 on the workpiece support 8, which is not wanted. The hoist frame 12 on the workpiece transport device 11 lifts the pieces 10 of sheet metal cut after tooling in the direction of the reinforcement on the workpiece support 8 of the latter into the position in FIG. 1. The amount of this hoist movement is smaller than the thickness of the cutting waste adhering to the workpiece support 8, i.e., smaller than the thickness of the cutting waste mentioned in the hoist direction; the relationship in FIG. 1 is the result.

Starting with the situation in FIG. 1, the pieces 10 of sheet metal cut and held on the hoist frame 12 are now moved by the workpiece transport device 11 in the horizontal direction, i.e., crosswise to the direction of the reinforcement of the workpiece support 8. The cut pieces 10 of sheet metal act as stops for cutting waste adhering to the workpiece support 8 and help break it loose from the rib-like projections 9. Then, the cut pieces 10 of sheet metal can be removed from the area near the workpiece support 8 by means of the workpiece transport device 11. The relative horizontal movement of the hoist frame 12 described above with the cut pieces of sheet metal 10 held on it, on one hand, as well as the workpiece support 8, on the other hand, is routinely brought about by the computer controls 14 of the laser-cutting machine 1, i.e., this relative movement takes place regardless of whether or not cutting waste is actually adhering to the workpiece support 8. The cutting waste loosened from the workpiece support 8 can also be taken away. Preferably, the workpiece support 8 has a grid structure for this purpose so that the cutting waste can fall through the openings in the grid before it is finally removed by the personnel operating the laser-cutting machine 1.

Instead of the partial movements of the cut sheet metal pieces 10 in two directions perpendicular to one another as described above, the cutting waste can be broken away from the workpiece support 8, by a steady diagonal movement of the cut sheet metal pieces 10 relative to the workpiece support 8 and to the cutting waste adhering to it.

As shown by the above, in the case of the laser-cutting machine in FIG. 1, the device for producing the relative movement of cutting waste and workpiece support 8 necessary to loosen the cutting waste from the workpiece support 8 comprises the workpiece transport device 11 with the cut sheet metal pieces 10 held on it and used as stops for the cutting waste to be loosened.

Figure 2:
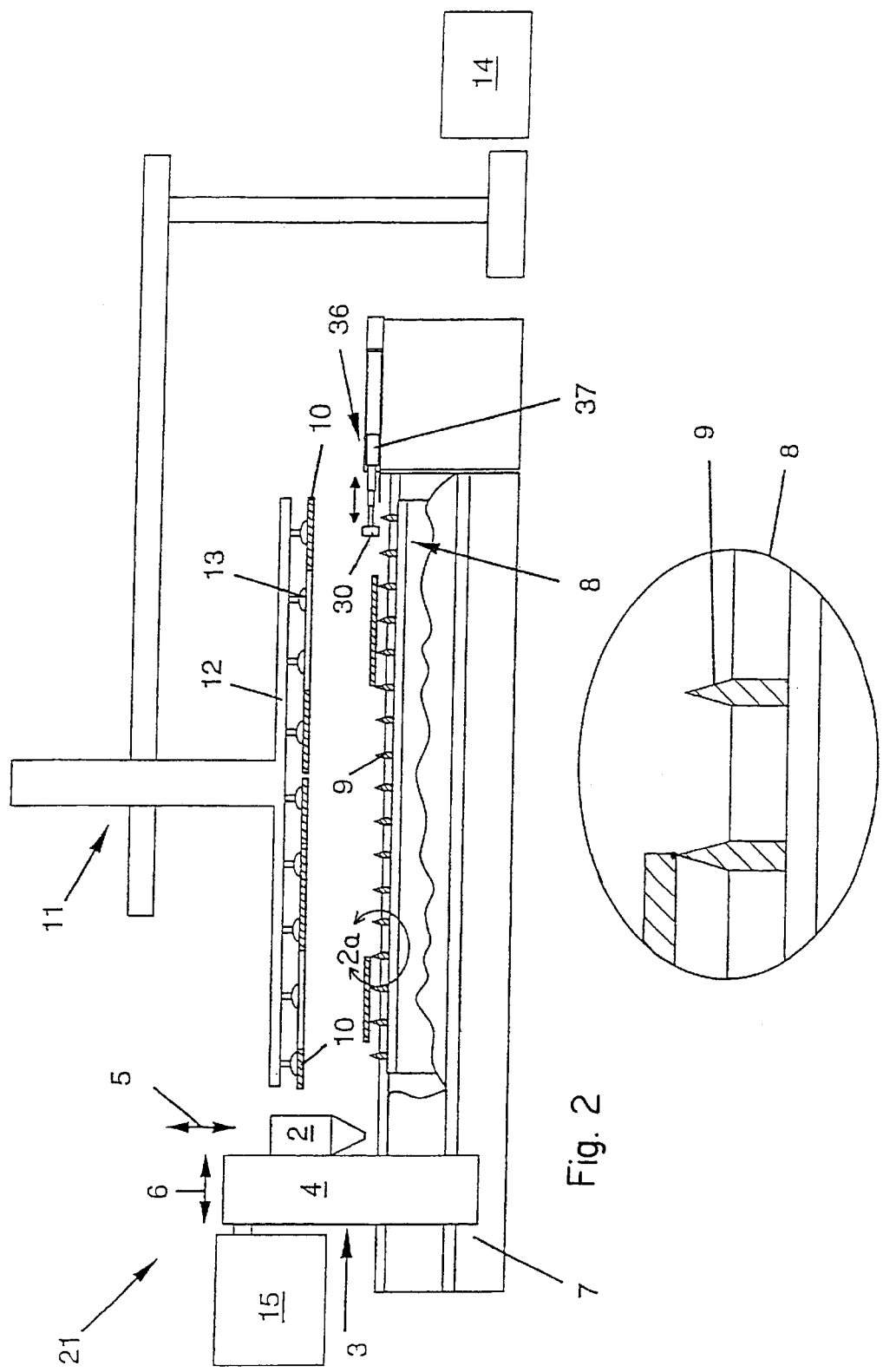
FIG. 2 is a schematic illustration of a second embodiment of the cutting machine.

FIG. 2 shows a different way of removing cutting waste adhering to a workpiece support that is different from the laser-cutting machine 1 in FIG. 1. The laser-cutting machine 21 has a device 36 used exclusively as such for producing relative movement between the workpiece support 8 and the cutting waste adhering to it. The device 36 basically consists of a pneumatic telescopic cylinder 37 and a stop 30 on it for cutting waste adhering to the workpiece support 8. The telescoping piston/cylinder 37 is extended as soon as the cutting operation on the sheet metal is finished, and the cut sheet metal pieces 10 have been lifted off the workpiece support 8 by the workpiece transport device 11. After the cutting waste is broken loose from the rib-like projections 9 of the workpiece support 8 by means of the stop 30, the telescoping/piston cylinder 37 is returned to its starting position. The computer controls 14 on laser-cutting machine 21 are used to control the telescoping/piston cylinder 37.

Figure 3:
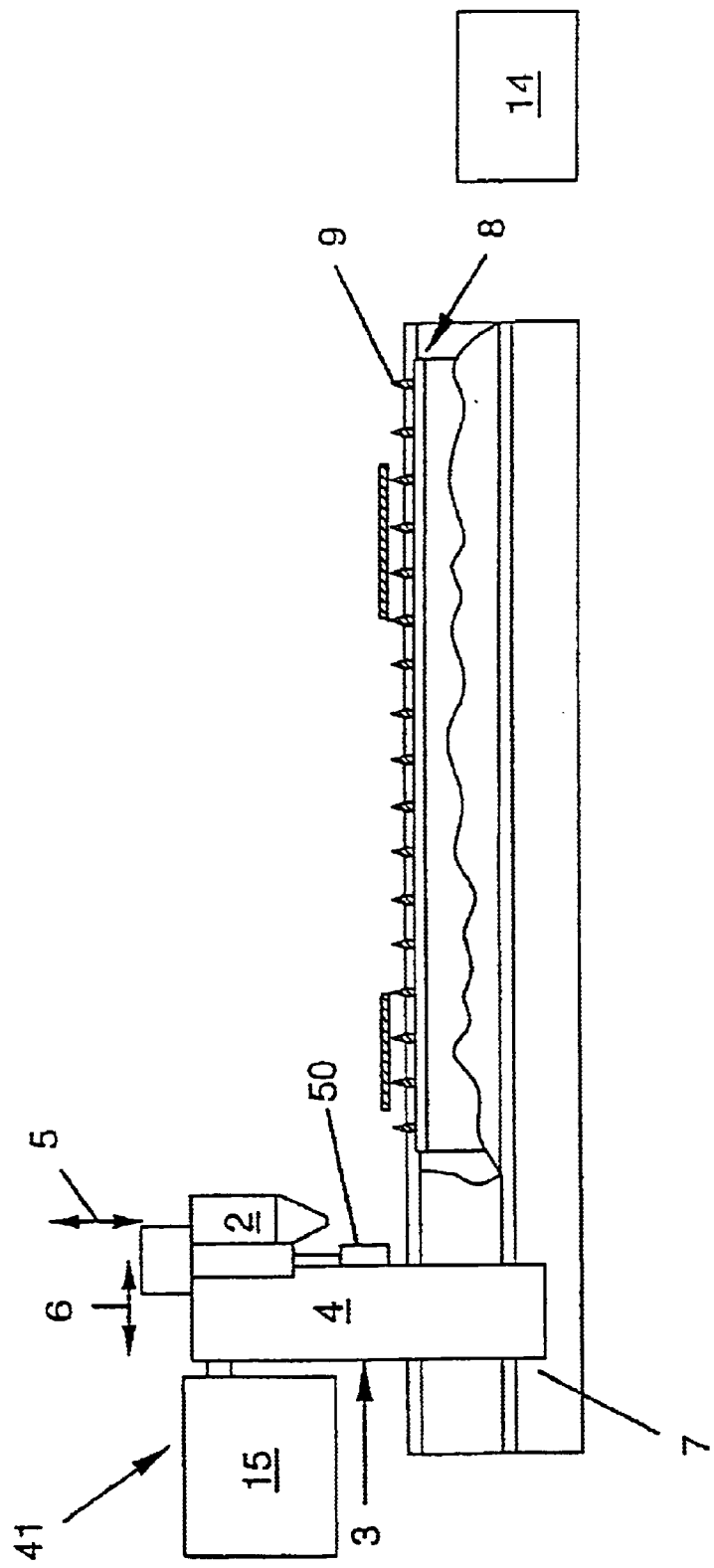
FIG. 3 is a schematic illustration of a third embodiment of the laser cutting machine.

In FIG. 3, the laser-cutting machine 41 has a machine support or bridge 3 which can move in the direction of the double arrow 6, and it has a stop 50 on it. The bridges with a stop 50 provides the relative movement between the workpiece support 8 and cutting waste adhering to it. The stop 50 can therefore be raised and lowered in the direction of double arrow 5. As the workpiece is being cut by the laser-cutting head 2 during the movement over the sheet metal, the stop 50 is lifted and is in its resting position. After the end of the cutting cycle, the cut sheet-metal pieces produced (not shown in FIG. 3 for the sake of simplicity), are lifted off the workpiece support 8 by the workpiece transport device (also not shown) before stop 50 moves from its resting position into its working position which is shown in FIG. 3. Then, the machine bridge 3 moves from its starting position shown in FIG. 3, and the stop 50 breaks loose the cutting waste that was welded to the rib-like projections 9 of the workpiece support 8. The functions of the stop 50 described and of the machine portal 3 are controlled by the computer control 14 on the laser-cutting machine 41.

Figure 4:
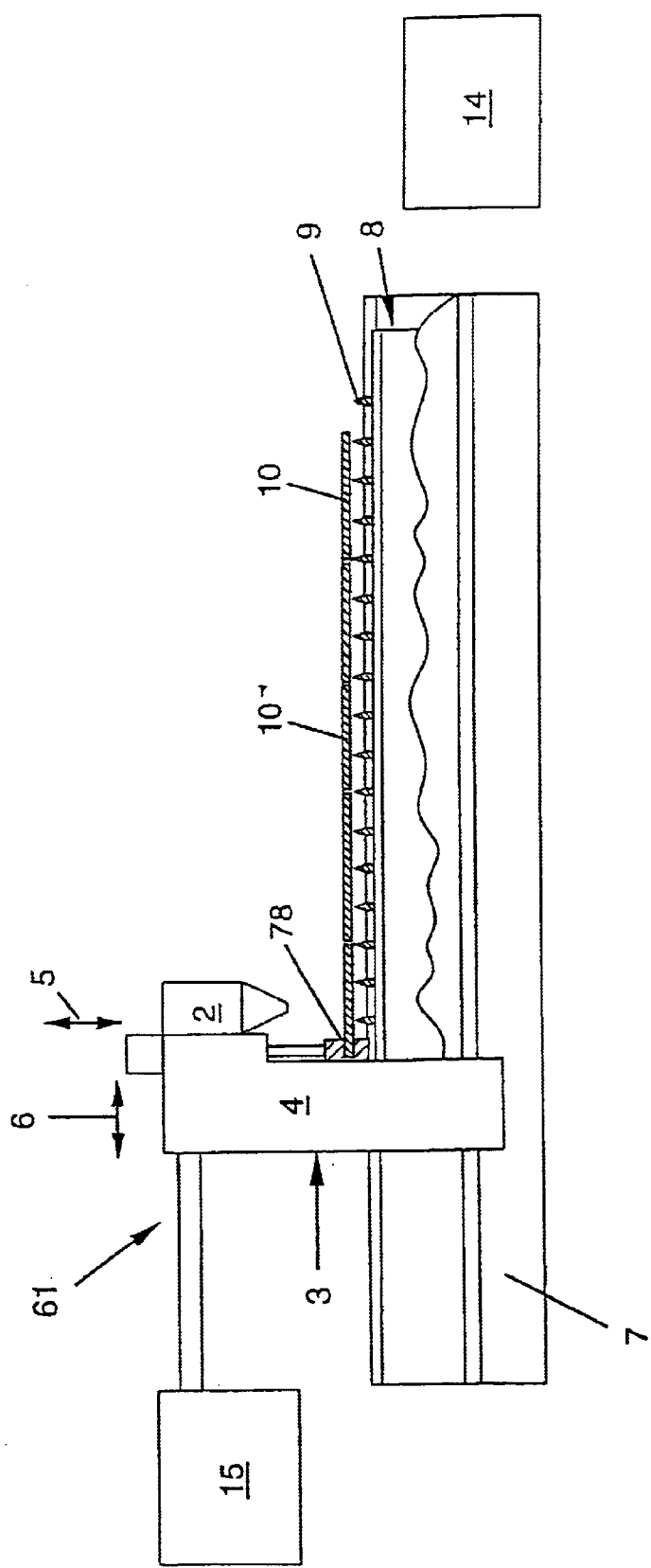
FIG. 4 is a schematic illustration of a fourth design of the laser cutting machine.

In the case of laser-cutting machine 61 shown in FIG. 4, the machine bridge 3 is part of the device for producing relative movement of the workpiece support 8 and the cutting waste adhering to it. The laser-cutting machine 61 corresponds to laser-cutting machine 1 in FIG. 1 and is different from laser-cutting machines 21, 41 in FIGS. 2 and 3. In this embodiment, the cut sheet-metal pieces 10 are used as a stop for the cutting waste to be removed. One of the cut sheet-metal pieces 10 is gripped by a holder 78 placed on the machine bridge 3 and has the form of a claw 78. After the piece 10 is cut, the piece 10 is pushed to the right out of its starting position shown in FIG. 4, and it also moves the other cut sheet-metal piece 10 accordingly. Cutting waste welded to the rib-like projections 9 on the workpiece support 8 is thereby broken loose by the cut pieces 10. The amount of relative movement of the cut sheet-metal pieces 10 caused by the machine bridge 3 in relation to the workpiece support 8 and the cutting waste adhering to it is in the millimeter range. The relative movement of the machine portal 3 described with the cut sheet-metal pieces 10 held on it and the workpiece support 8, and the coupling of the claw 78 to the sheet-metal piece 10, are also controlled by the computer controls 14 on the laser-cutting machine 61. The machine bridge 3 with the claw 78 can also be used as a workpiece transport device to transport the workpiece support 8 with the sheet metal being cut and/or to remove the cut sheet-metal pieces 10 from the workpiece support 8; it can then be used in addition to or alternatively to a workpiece transport device 11 of the type described above.

Figure 5:
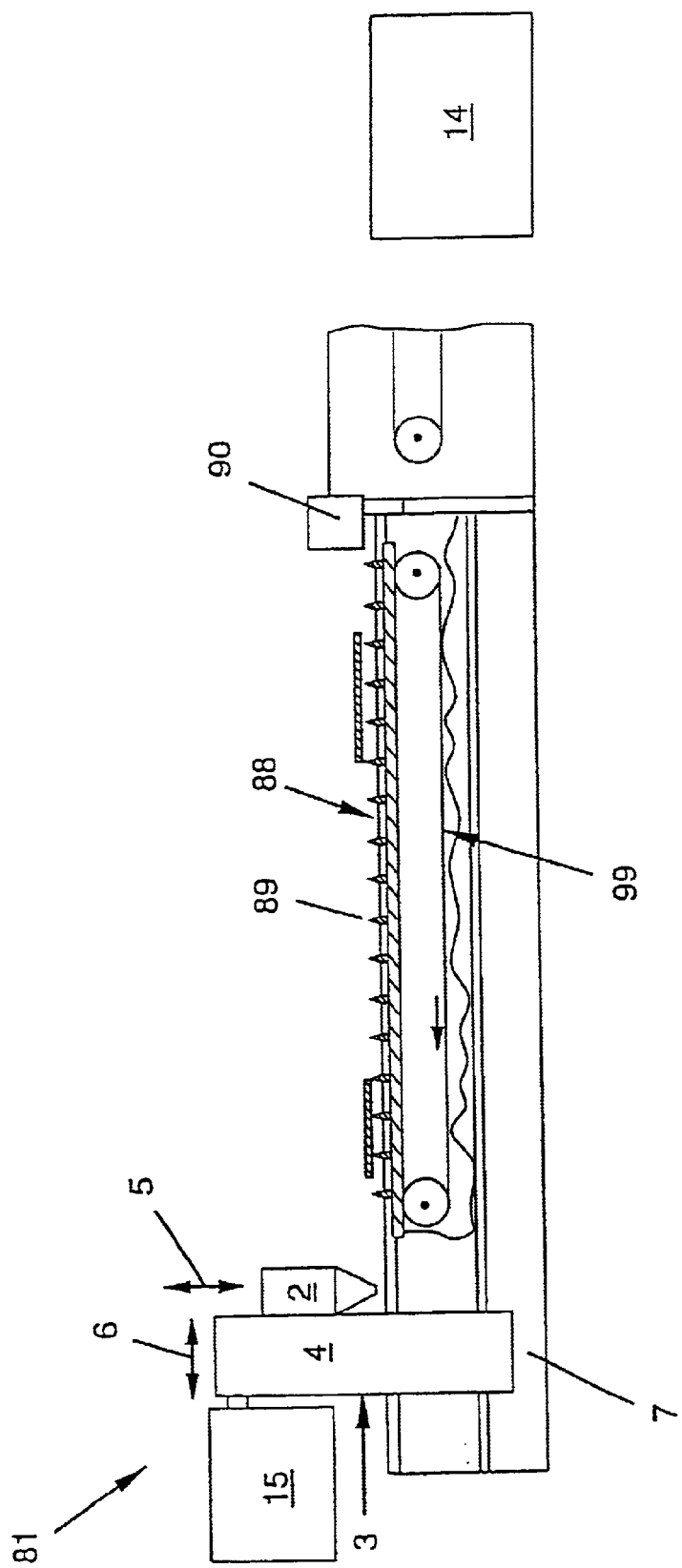
FIG. 5 is a schematic illustration of the fifth design of a laser cutting machine.
Figure 6:
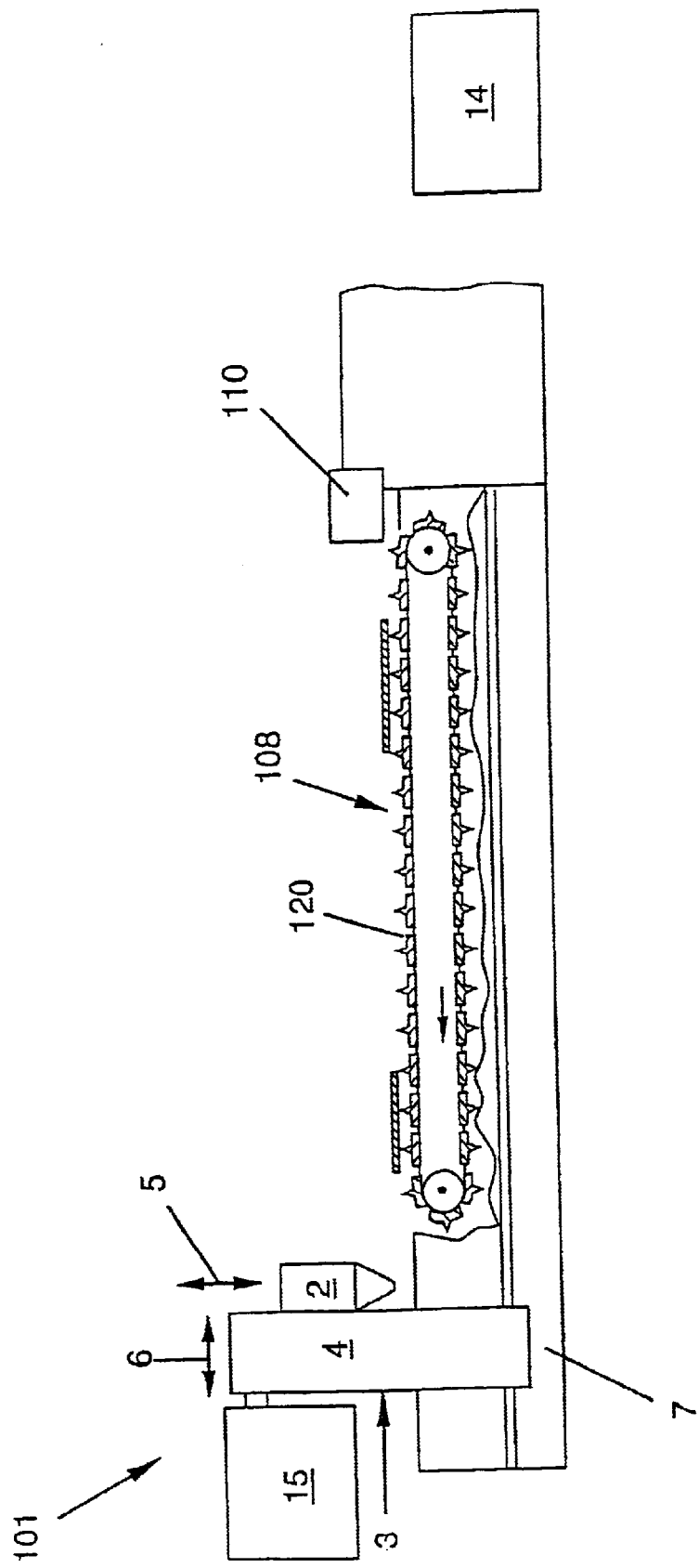
FIG. 6 is a schematic illustration of the sixth design of a laser cutting machine.

The laser-cutting machines 81, 101 shown in FIGS. 5 and 6 are different from laser-cutting machines 1, 21, 41, 61 described above in that workpiece supports 98, 108 can move in relation to stationary stops 90, 110, in order to produce the relative movement of cutting waste and the respective workpiece support 88, 108 necessary to loosen the cutting waste.

In FIG. 5, the whole workpiece support 88 is moved by means of a revolving drive belt 99 in the horizontal direction, i.e., crosswise to the direction of the workpiece reinforcement on workpiece support 88. Cutting waste adhering to rib-like projections 89 on workpiece support 88 thus abuts stop 90 and is thereby broken loose by workpiece support 88.

Stop 110 on laser-cutting machine 101 in FIG. 6 also works like a scraper. Unlike the machine design in FIG. 5, workpiece support 108 on laser-cutting machine 101 is designed on a segment 120 of an endless revolving ribbed chain.

Workpiece supports 88, 108 form, with the accompanying stop 90, 110, the means for producing relative movement between workpiece support 88, 108 and the cutting waste adhering to it.

Apart from the differences indicated, the machine designs described above are identical to one another in design and function. In particular, laser-cutting machines 41, 61, 81, 101 can also be equipped with a workpiece-transport device 11 as in FIGS. 1 and 2. The same machine components in the various drawings have identical reference numbers and letters.

Having thus described the invention, what is claimed is:
1. In a process for thermal cutting of workpieces, the steps comprising:
   (a) placing a workpiece on a workpiece support of a thermal cutting machine including a computer control for effecting relative movement of a thermal cutting tool and said workpiece;
   (b) effecting relative movement between said thermal cutting tool and said workpiece by said computer control to thermally cut said workpiece on said workpiece support to produce free cut product (10) freely resting on said workpiece support (8) and cut product adhered to said workpiece support; and
   (c) effecting relative movement between said adhered cut product and a stop to cause said adhered cut product and stop to abut with an impact of a magnitude sufficient to break the adhesion of said cut product and free it from the workpiece support.

2. The thermal cutting process in accordance with claim 1 wherein said workpiece support comprises a grid of upstanding ribs and reinforcing elements and wherein relative movement of said adhered cut product and stop is transverse to the direction of the reinforcing elements in the workpiece support.

3. The thermal cutting process in accordance with claim 1 wherein the amount of relative movement is smaller than the corresponding dimension of the cut product adhering to said support.

4. The thermal cutting process in accordance with claim 1 wherein said step of effecting relative movement of said stop and adhered cut workpiece utilizes a workpiece transport device having at least one holder engaging free cut product to be removed, said stop being provided on said transport device and wherein said transport device and adhered cut workpiece are moved relative to one another to produce said impact force.

5. The thermal cutting process in accordance with claim 4 wherein said free cut product held on said holder provides said stop.

6. The thermal cutting process in accordance with claim 1 wherein said workpiece is used as said stop (10) for cut product adhering to the workpiece support (8) and wherein said workpiece is moved relative to the workpiece support crosswise to the direction of the workpiece reinforcement in workpiece support (8).

7. The thermal cutting process in accordance with claim 1 wherein said stop is provided on a movable support for said thermal cutting tool, said cutting tool support (8) being driven relative to said workpiece and cut product adhering to said workpiece support.

8. The thermal cutting process in accordance with claim 7 wherein said support for said thermal cutting tool is a machine bridge (3) which moves over the workpiece support (8) and can be moved and driven crosswise to the direction of the workpiece reinforcement of the workpiece support (8), said stop being movable in a direction perpendicularly to said workpiece from an upper position above said workpiece to a lower position in which it extends below die upper surface of the workpiece.

9. The thermal cutting process in accordance with claim 8 wherein said stop includes a clamping member which grips a free cut product which is moved thereby against said adhered cut product.

10. The thermal cutting process in accordance with claim 1 wherein said stop is provided adjacent said workpiece support and has a portion movable horizontally over said workpiece support to impact upon adhered cut product.

\* \* \* \* \*

UNITED STATES PATENT AND TRADEMARK OFFICE
CERTIFICATE OF CORRECTION

PATENT NO. : 6,642,479 B2
DATED : November 4, 2003
INVENTOR(S) : Hans Klingel

It is certified that error appears in the above-identified patent and that said Letters Patent is hereby corrected as shown below:

Column 6,
Line 47, "die" should be -- the --.

Signed and Sealed this

Ninth Day of March, 2004

JON W. DUDAS
*Acting Director of the United States Patent and Trademark Office*